Oct. 18, 1966    N. E. EVANS    3,279,855
CONVEYOR STRUCTURE FOR CONTINUOUS MINING MACHINES
Filed Sept. 26, 1963    3 Sheets-Sheet 3

INVENTOR.
Nolan E. Evans
BY
ATTORNEYS

United States Patent Office 3,279,855
Patented Oct. 18, 1966

3,279,855
CONVEYOR STRUCTURE FOR CONTINUOUS MINING MACHINES
Nolan E. Evans, Chicago, Ill., assignor to Goodman Manufacturing Company, Chicago, Ill., a corporation of Illinois
Filed Sept. 26, 1963, Ser. No. 311,758
7 Claims. (Cl. 299—64)

This invention relates to improvements in continuous mining machines of the multiple boring type and more particularly relates to an improved conveyor structure for such machines.

A principal object of the present invention is to provide a simpler and more reliable conveyor structure for continuous mining machines and the like, arranged with a view toward simplicity in construction and flexibility in operation.

Another object of the invention is to improve upon conveyor structures for continuous mining machines of the rotary boring type having a lower vertically adjustable trimmer bar for cutting along a mine floor, in which the conveyor structure is mounted on the base frame of the machine and is held from tilting movement with respect to the base frame, but is moved longitudinally of the machine by vertical adjustable movement of the trimmer bar for various cutting heights and upon elevation of the trimmer bar into a tramming position;

A further object of the invention is to provide a novel and improved conveyor structure particularly adapted for continuous mining machines of the rotary boring type having a cutter frame supporting a pair of boring heads and having trimmer bars trimming the cusps left between the boring heads, in which the cutter frame, boring heads and trimmer bars are adjustable relative to the main frame of the machine about axes extending longitudinally and transversely thereof, in which the conveyor is mounted on the main frame of the machine and extends for the length thereof and is connected with the lower trimmer bar for elevation therewith and accommodates movement of the lower trimmer bar about axes extending longitudinally and transversely of the machine, and in which the length of the conveyor is unchanged when moved vertically by rectilinear movement of the lower trimer bar, and the conveyor chain is, therefore, always in adjustment in all positions of adjustment of the lower trimmer bar with respect to the ground.

A still further object of the invention is to simplify the construction of the conveyors for continuous mining machines by eliminating the usual extensible and retractible front section of the conveyor and the need to take up on or relieve tension from the conveyor chain during adjustment thereof, by extensibly and retractibly moving the entire conveyor with respect to the machine, as the lower trimmer bar is adjustably moved with respect to the mine bottom, and by pivoting the front and rear sections of the conveyor to move about a common axis extending transversely of the machine and providing a slide retaining the pivot from vertical movement and accommodating longitudinal movement of the pivot with respect to the main frame of the machine.

A further object of the invention is to provide an improved and simplified continuous mining machine structure, including an adjustable cutter frame supported on the base frame of the machine and having a lower trimmer bar adjacent the ground, in which the conveyor for the machine has its support on the base frame and is articulated intermediate its ends on the base frame and has slidable connection with the lower trimmer bar to move relative thereto during mining and to be vertically moved therewith upon vertical adjustment of said lower trimmer bar, in which a movable support is provided for the rear end portion of the conveyor and the point of articulation of the conveyor is movable along the base frame to accommodate variations in vertical adjustment of the lower trimer bar and receiving end of the conveyor.

These and other objects of the invention will appear from time to time as the following specification proceeds and with reference to the accompanying drawings wherein.

Figure 1:
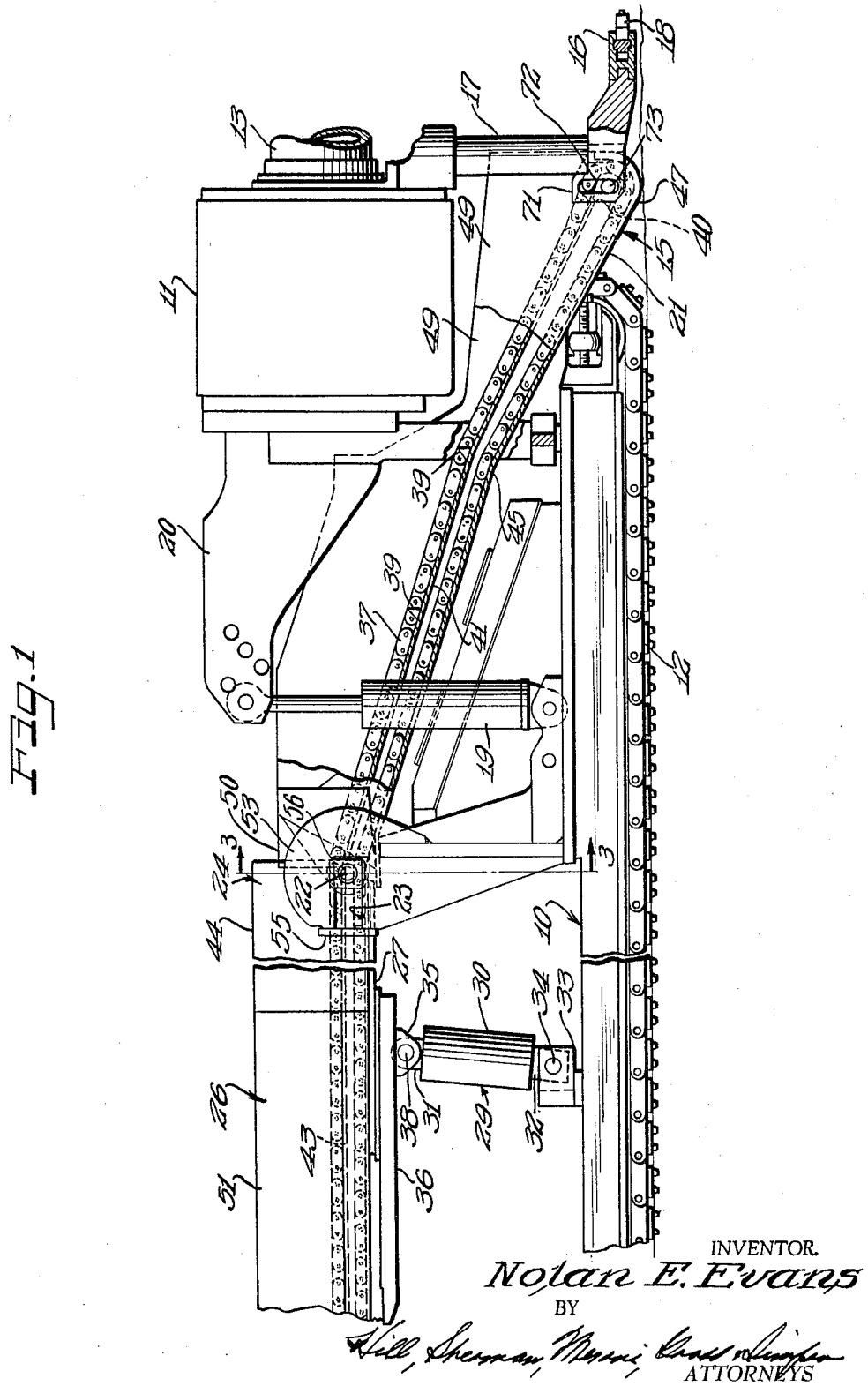
FIGURE 1 is a partial fragmentary longitudinal sectional view taken through a continuous mining machine constructed in accordance with the principles of the present invention showing the lower trimmer bar in position to cut along a mine floor.

In the embodiment of the invention illustrated in the drawings, 10 generally designates a mobile base or main frame of a continuous mine machine, having a cutter frame 11 adjustably supported thereon and extending in advance thereof and mounted on the main frame 10 for vertical adjustment with respect thereto and for angular adjustment about axes extending longitudinally and transversely of said main frame.

The main frame 10 is supported on conventional laterally spaced continuous traction tread devices 12, which serve to transport the machine along the ground from working place to working place and to feed the boring heads of the machine (not shown) mounted on and projecting forwardly of the cutter frame 11, to cut contiguous bores in a working face. The boring heads may be conventional boring heads supported on the cutter frame 11 and rotatable about the axes of spaced hubs 13, 13 on opposite sides of an elevating conveyor 15. The boring heads may be of a conventional form and are no part of the present invention so need not herein be shown or described further.

The cutter frame 11 also has a lower trimmer bar 16 supported in depending relation with respect to said cutter bar and adjustably moved with respect to the ground and held in fixed positions for cutting and tramming by parallel spaced hydraulic jacks 17. A cutter chain 18 is guided for movement along the lower trimmer bar and is guided upwardly from opposite ends of said trimmer bar in front of the cutter frame 11 for movement along an upper trimmer bar (not shown), for cutting the cusps left between the boring heads and depending from the mine roof and extending upwardly of the mine floor.

A pair of hydraulic jacks 19, 19 is pivotally mounted on the main frame 10 at opposite sides of the conveyor 15 and extend upwardly therefrom and are pivotally connected at their upper ends to arms 20, 20 extending rearwardly of the cutter frame 11 and serve to tilt said cutter frame and the trimmer bar 16 about axes extending longitudinally and transversely of said main frame in a manner well known to those skilled in the art so not herein shown or described further.

The conveyor 15 is a conventional form of laterally flexible center strand endless chain and flight conveyor and includes a receiving or elevating section 21 connected at its forward end with the lower trimmer bar 16 and elevated by said trimmer bar about the axes of coaxial pivot pins 22 guided in longitudinally extending slides 23 at opposite sides of the conveyor. The conveyor 15 also includes a discharge section 24 forming a continuation of the receiving and elevation section 21, and having a laterally flexible discharge portion 26 moved laterally along a support plate 27, to discharge material to one side or the other of the center line of the machine.

The laterally flexible discharge section 26 is supported on a hydraulic jack 29 shown as being in the form of a cylinder 30 having a piston rod 31 extensible therefrom. The cylinder 30 has an ear 32 depending therefrom between connectors 33 extending upwardly of the base frame 10 and transversely pivoted thereto as by a pivot pin 34. The piston rod 31 extends between connectors 35 depending from the bottom of a support plate 36 and is transversely pivoted thereto as by a pivot pin 38. The jack 29 serves to raise and lower the discharge end portion of the conveyor 15 about the axis of the pivot pins 22 and also serves as a support for the discharge section of the conveyor and moves about its pivot 34 upon longitudinal movement of the entire conveyor, as the lower trimmer bar 16 is vertically adjusted, as will hereinafter more clearly appear as this specification proceeds.

The conveyor 15 has a laterally flexible endless chain 37 having flights 39 projecting from opposite sides thereof and extending about an idler 40 at the front of the front receiving section, and upwardly along a material carrying plate 41 to and along a material carrying plate 43 forming a longitudinal extension of material carrying plate 41 and extending between side frame plates 44, 44 of the discharge section 24 about a drive sprocket (not shown) at the rear end portion of said discharge section. The drive sprocket is driven from a suitable motor (not shown) in a conventional manner. From the drive sprocket (not shown) the conveyor chain 37 extends along the discharge portion 26 in a forward direction to and downwardly along a plate 45 supporting the lower run of the conveyor and extending downwardly in an inclined direction beneath the idler 40 and has a bottom ground engaging surface 47 beneath said idler. From the ground engaging surface 47, the forward end portion of the plate 45 extends upwardly in advance of the idler 40, and serves to retain the mined material onto said conveyor and to accommodate the flights 39 to pick up the loose material discharged and be carried upwardly along the inclined plate 41.

The forward receiving or elevating section 21 of the conveyor has parallel spaced side walls 49, 49 extending along opposite sides of the plates 41 and 45 and connected at their lower ends to the plate 45 and extending upwardly of the plate 41 and rearwardly therealong to positions adjacent the forward end portion of the side plates or walls 44 of the discharge section of the conveyor.

Figure 2:
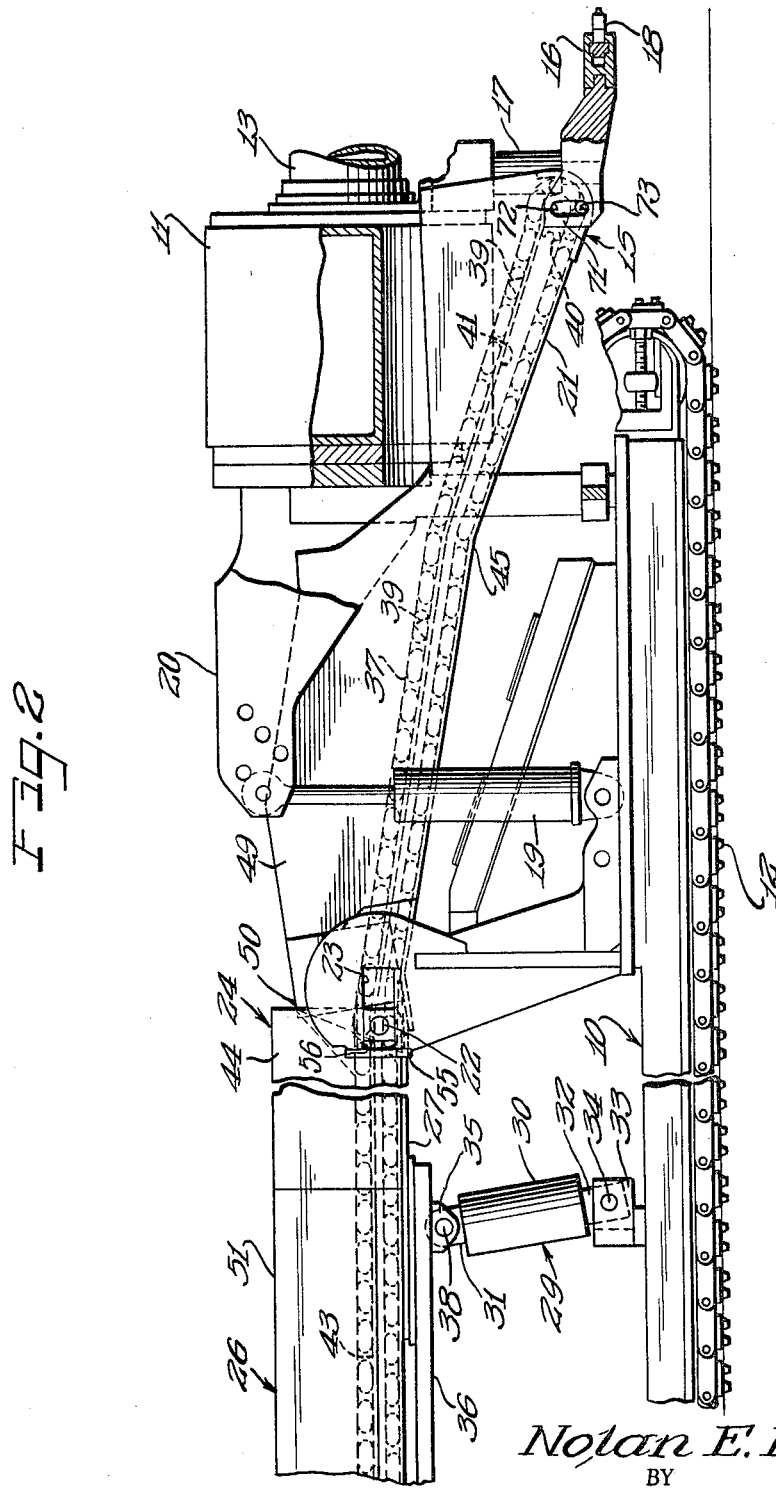
FIGURE 2 is a view somewhat similar to FIGURE 1, but showing the lower trimmer bar in an elevated tramming position and elevating the conveyor therewith.
Figure 3:
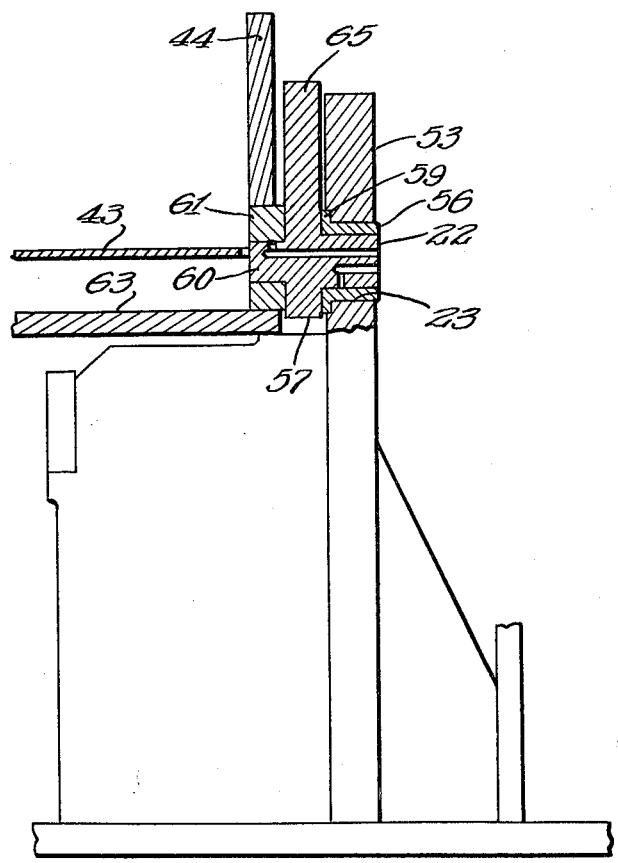
FIGURE 3 is a partial fragmentary transverse sectional view looking substantially along line 3—3 of FIGURE 1.
Figure 4:
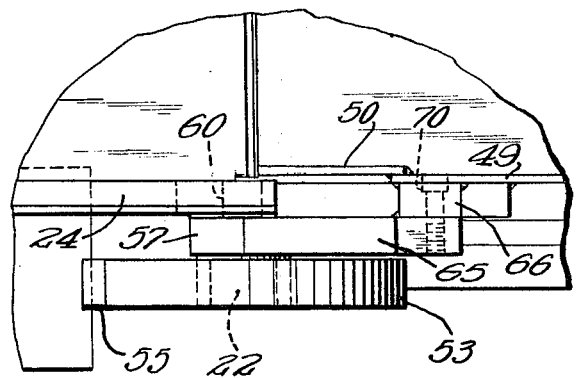
FIGURE 4 is an enlarged partial fragmentary detail plan view taken at the point of articulation of the conveyor.

As shown in FIGURES 1, 2 and 4, each side plate 49 has a wing or plate 50 welded to the inside therof and extending rearwardly therefrom along the inner side of the side plate 44. The wing 50 thus closes the gap between the front section of the conveyor and the rear section of the conveyor upon vertical adjustment of said sections with respect to each other.

The flexible side walls 51 of the laterally swingable discharge portion of the conveyor slidably extend along the insides of the rear end portions of the side plates 44 and are suitably guided therein. The side walls 51 are of a conventional form and form no part of the present invention so need not herein be shown or described further.

The slide 23 is shown as being formed in upper end portion of an upright support or post 53 extending upwardly of the main frame or base 10, it being understood that one support is provided on each side of the conveyor 15. The support 53 has the longitudinally extending slot 23 formed therein and closed by an end plate 55 suitably secured to the rear end portion of said support and extending across the slot 23.

A slide or block 56 is shown as being slidably guided in the slot 23. The block 56 may be made from a bearing material and serves as a bushing for the pivot pin 22, journalling said pin for movement about an axis extending transversely of the conveyor and also supporting said pin for slidable movement along the slot 23. The pin 22 extends outwardly from a boss portion 57, abutting an inner flanged portion 59 of the slide or bushing 56. A pivot pin 60 coaxial with the pivot pin 22 extends inwardly of the boss 57 within a boss 61 for the discharge section 24 of the conveyor. The boss 61 extends upwardly of a bottom plate 63 and is suitably secured thereto and also has the plate 44 extending therealong and suitably secured thereto. The boss 57 has a wing portion 65 extending angularly forwardly and upwardly therefrom along the outer side of a plate 66 extending along the rear end portion of the plate 49 and welded or otherwise secured thereto. The plate 66 is secured to the wing portion 65 as by machine screws 70.

The slides 56 on opposite sides of the conveyor and the oppositely extending coaxial pivot pins 22 and 60 thus form a slidable support for the adjacent ends of the front receiving section and the rear discharge section of the conveyor, and mount the adjacent ends of said sections of the conveyor for vertical adjustable movement with respect to each other and also support the two sections for longitudinal slidable movement with respect to the base frame 10 and the cutter frame 11.

The lower trimmer 16 has a pair of parallel spaced ears 71 extending rearwardly therefrom along opposite sides of the side walls 49 of the receiving section of the conveyor. The ears 71 have vertical slots 72 therein, slidably receiving bearing pins 73 extending laterally of the side plates 49, coaxial with the axis of rotation of the direction changing idler 40.

In operation of the machine, when the lower bar trimmer 16 is positioned to guide the trimmer chain 18 to cut along the ground, the ground engaging portion 47 of the receiving section of the conveyor, riding along the ground, is free to move upwardly and downwardly along the ground in a controlled path controlled by the vertical slots 72 and the bearing pins 73, slidably guided therein, and during this up and down movement will slightly move the conveyor sections 21 and 24 along the slides 23 in a forward and rearward direction, depending upon the direction of movement of the conveyor when following the ground.

As the lower trimmer bar is elevated to accommodate tramming of the machine to a new working place by the traction devices 12, the bottoms of the slots 72 will engage the bearing pins 73 and may lift the front receiving section above the ground, to the solid line position shown in FIGURE 2. As the front section is lifted from the position shown in FIGURE 1 to the position shown in FIGURE 2, the bushings or slides 56 will move along the supporting slots 23 toward the extreme rear end portions thereof, as shown in FIGURE 2. During this backward movement of the entire conveyor 15, the hydraulic jack 29 will pivot about the axis of the pivot pin 34 and movably support the discharge section of the conveyor during the entire cycle of retractible movement thereof, into the retracted position shown in FIGURE 2.

With the conveyor structure just described, the conveyor is mounted directly on the base frame 10 and is connected with a lower trimmer bar in such a manner as to accommodate tilting movement of the cutter frame 11 and lower trimmer bar with respect to the base frame about axes extending longitudinally and transversely of the base frame, while the conveyor itself is held from tilting movement by the base frame. The bushings or slide blocks 56 form slidable supports for the receiving and discharge sections of the conveyor, accommodating tilting movement of said sections about the axes of the pivot pins 22 independently of each other and also accommodating the raising of the forward end portion of the receiving section of the conveyor by the trimmer bar 16 in a vertical path, and moving backwardly along the slides to enable the forward end of the conveyor to be vertically moved in a rectilinear vertical path into various positions of adjustment and into an extreme elevated tramming position.

It may further be seen that the elevating jack 29 forms a support for the rear section of the conveyor on the base 10 and pivots about its axis of pivotal connection to the base or main frame and thereby accommodates forward and backward movement of the entire conveyor as the receiving section of the conveyor follows the ground and is moved into elevated positions by vertical movement of the lower trimmer bar 16.

While I have herein shown and described one form in which the invention may be embodied, it may readily be understood that various variations and modifications in the invention may be attained without departing from the spirit and scope of the novel concepts thereof.

I claim as my invention:

1. In a continuous mining machine, a mobile base frame, a cutter frame disposed above said base frame and mounted on the forward end of said frame and extending in advance thereof, a horizontally disposed trimmer bar depending from said cutter frame and mounted on said cutter frame for vertical adjustable movement toward and from the floor, an endless conveyor extending along said base frame and having an inclined elevating receiving section extending upwardly from the ground from a position adjacent said lower trimmer bar, and a generally horizontal discharge section forming a rear continuation of said elevating section, a lost motion connection between said trimmer bar and the receiving end of the receiving section of said conveyor vertically moving the receiving end of the receiving section of said conveyor in a rectilinear path and accommodating sidewise tilting movement of said trimmer bar with respect to said receiving section and guiding the receiving end of the receiving section of said conveyor for independent up and down movement in a rectilinear path during mining, a transverse pivotal connection between adjacent ends of said receiving and discharge sections of said conveyor, connecting said receiving and discharge sections for independent vertical movement about the axis of said connection, a slide for said transverse pivotal connection slidably mounted on said base frame and supporting said receiving and discharge sections for movement longitudinally of the machine and movable support means for said discharge trough section, movably supporting said discharge trough section for bodily movement along said base frame effected by rectilinear up and down movement of the receiving end of said receiving section of the conveyor.

2. In a continuous mining machine, a mobile base frame, a cutter frame disposed above said base frame and mounted on the forward end of said base frame and extending in advance thereof, a horizontally disposed trimmer bar depending from said cutter frame and mounted on said cutter frame for vertical adjustable movement toward and from the mine floor in a rectilinear path, an endless conveyor extending along said base frame and having an inclined elevating receiving section extending upwardly from the ground from a position in advance of the forward end of said base frame and adjacent said trimmer bar, and also having a generally horizontal discharge section forming a rear continuation of said receiving section, a lost motion connection between said trimmer bar and the forward end of said receiving section accommodating sidewise tilting movement of said trimmer bar with respect to said receiving section and independent up and down movement of the receiving section during mining, and guiding the forward end portion of the receiving section for movement in a rectilinear path, a movable support for said discharge section of said conveyor supporting said discharge section for movement longitudinally of said base frame, coaxial transverse pivotal connections between opposite sides of said receiving and discharge sections of said conveyor accommodating independent vertical angular movement of said sections, and aligned slides at opposite sides of said conveyor supporting said transverse pivotal connections on said base frame for longitudinal movement therealong.

3. In a continuous mining machine, a mobile base frame, a cutter frame disposed above said base frame and mounted on the forward end of said base frame and extending in advance thereof, a horizontally disposed trimmer bar depending from said cutter frame and mounted on said cutter frame for vertical adjustment toward and from the mine floor, and endless chain and flight conveyor extending along said base frame and having an inclined elevating receiving section extending upwardly from the ground from the position adjacent said trimmer bar and a generally horizontal discharge section forming a rear continuation of said inclined elevating section, pivot means connecting the adjacent ends of said receiving and discharge sections of said conveyor for independent up and down movement with respect to each other, a vertical slot and pin connection between said trimmer bar and forward end portion of said receiving section, accommodating sidewise tilting movement of said trimmer bar with respect to said receiving section and vertically moving said receiving section upon vertical adjustment of said trimmer bar into various cutting positions and into a tramming position, means supporting the discharge section of said conveyor on said main frame for longitudinal movement with respect thereto, and horizontal slide means slidably supported on said base frame and supporting said pivot means for longitudinal movement along said base frame, to compensate for vertical movement of the forward end portion of said receiving section in a rectilinear path, effected by said pin and slot connection between said trimmer bar and said receiving section.

4. In a continuous mining machine, a mobile base frame, a cutter frame disposed above said base frame and mounted on the forward end of said base frame and extending in advance thereof, a horizontally disposed trimmer bar depending from said cutter frame and supported on said frame for vertical adjustment toward and from the mine floor in a rectilinear path, an endless chain and flight conveyor extending along said base frame and having an inclined elevating receiving section extending upwardly from the ground from a position in advance of said base and adjacent said trimmer bar, and a generally horizontal discharge section forming a rear continuation of said inclined elevating section, a fluid pressure jack transversely pivoted to said base frame and forming a movable support for said discharge section of said conveyor and operable to vertically move said discharge section with respect to said base frame, slide means on opposite side of said conveyor at the adjacent ends of said receiving section and said discharge section, coaxial pivot pins carried by said slide means and forming coaxial pivotal mountings for said receiving section and said discharge section of said conveyor, and a vertical slot and pin connection between said trimmer bar and the forward end portion of said receiving section, moving the forward end portion of said receiving section in a rectilinear path about the axes of said pivot pins and moving said slide means and pivot pins longitudinally of said base frame upon vertical adjustable movement of said lower trimmer bar.

5. In a continuous mining machine, a mobile base frame, a cutter frame supported on said base frame and mounted for vertical adjustment relative thereto, a lower trimmer bar operable at floor level and supported on said cutter frame for vertical adjustment relative thereto, a chain conveyor extending rearwardly of said trimmer bar and having aligned receiving and discharge sections and an articulated interconnection between said sections, enabling tilting movement of either section in a vertical direction relative to the other, said receiving section being downwardly and forwardly inclined relative to said discharge section, a pin and vertical slot connection between the front end of said receiving section and said trimmer bar enabling said trimmer bar to tilt sidewise independently of said conveyor and accommodating up and down movement of said conveyor with respect to said receiving section and lifting said receiving section upon vertical lifting movement of said trimmer bar, bracket means carried by said main frame, a pin and horizontal slot connection between said bracket means and said articulated connection enabling forward and backward movement of the entire conveyor relative to the main frame in response to vertical movement of the lower trimmer bar sufficient to move the receiving section of said conveyor longitudinally of said base frame, and movable support means carried by said base frame behind said bracket means for supporting the rear end of said discharge conveyor section in a range of selected vertical discharge positions and accommodating longitudinal movement of said discharge section with said receiving section.

6. In a continuous mining machine, a mobile base frame, a cutter frame supported on said base frame and mounted for vertical adjustment relative thereto, a lower trimmer bar operable at floor level and supported on said cutter frame for vertical adjustment relative thereto, a chain conveyor extending rearwardly of said trimmer bar and having aligned receiving and discharge sections and an articulated interconnection between said sections, enabling tilting movement of either section in a vertical direction relative to the other, said receiving section being downwardly and forwardly inclined relative to said discharge section, a pin and vertical slot connection between the front end of said receiving section and said trimmer bar enabling said trimmer bar to tilt sidewise independently of said conveyor and accommodating up and down movement of said conveyor with respect to said receiving section and lifting said receiving section upon vertical lifting movement of said trimmer bar, bracket means carried by said main frame, a pin and horizontal slot connection between said bracket means and said articulated connection enabling forward and backward movement of the entire conveyor relative to the main frame in response to vertical movement of the lower trimmer bar sufficient to move the receiving section of said conveyor longitudinally of said base frame, and movable support means carried by said base frame behind said bracket means for supporting the rear end of said discharge conveyor section in a range of selected vertical discharge positions and accommodating longitudinal movement of said discharge section with said receiving section, comprising a hydraulic jack transversely pivoted to said base frame and having transverse pivotal supporting connection with said discharge section and pivoting therewith upon longitudinal movement of said receiving and discharge conveyor sections effected by vertical movement of said lower trimmer bar.

7. In a continuous mining machine, a mobile base frame, a cutter frame disposed above said base frame and mounted on the forward end of said base frame for tilting movement with respect thereto, and extending in advance thereof, a horizontally disposed lower trimmer bar, hydraulic jack means suspending said trimmer bar from said cutter frame and adjustably moving said trimmer bar toward and from said cutter frame, a conveyor including a rear discharge trough section having side walls and a material carrying plate connecting said side walls together, a front elevating trough section extending forwardly of said rear trough section toward the ground and having parallel spaced side walls and a material plate connecting said side walls together, and mounted for vertical movement with respect to said rear trough section, a supporting and elevating connection between said trimmer bar and the forward end of said front elevating trough section accommodating angular movement of said trimmer bar with respect to said elevating trough section comprising vertically extending slots at opposite sides of said front elevating section and pins extending within said slots, a supporting and elevating connection between said base frame and said rear discharge trough section comprising a hydraulic jack transversely pivoted to said base frame and having transverse pivotal supporting connection with said discharge trough section, for elevating and lowering said discharge trough section and supporting said discharge trough section for movement longitudinally of said base frame, and a longitudinally slidable pivotal connection between the adjacent ends of said elevating trough section and said discharge trough section comprising longitudinal guides extending along opposite sides of said trough sections, a slide guided in each of said guides for movement therealong and retained for vertical movement thereby, a boss on each side of said trough sections, each boss having a wing extended therefrom and connected with the side walls of said front trough section, a pivot pin extending outwardly of said boss and journaled in said slide, and a coaxial pivot pin extending inwardly from said boss and forming a pivotal support for said rear trough section.

References Cited by the Examiner
UNITED STATES PATENTS

| | | | |
|---|---|---|---|
| 2,715,527 | 8/1955 | Cartlidge et al. | 299—57 |
| 2,734,731 | 2/1956 | Cartlidge et al. | 299—57 |
| 2,868,526 | 1/1959 | Jamison et al. | 299—59 |
| 2,984,470 | 5/1961 | Kraft | 299—57 |
| 3,149,882 | 9/1964 | Silks et al. | 299—56 |

ERNEST R. PURSER, *Primary Examiner.*